US011102383B2

(12) United States Patent
Tsai et al.

(10) Patent No.: US 11,102,383 B2
(45) Date of Patent: Aug. 24, 2021

(54) IMAGE CAPTURING DEVICE WITH A CLEAR STATUS OF OPERATION

(71) Applicant: Chicony Electronics Co., Ltd., New Taipei (TW)

(72) Inventors: Pei-Sheng Tsai, New Taipei (TW); Jian-Fong Hong, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/884,067

(22) Filed: May 27, 2020

(65) Prior Publication Data

US 2021/0211560 A1    Jul. 8, 2021

(30) Foreign Application Priority Data

Jan. 7, 2020  (TW) .................................. 109100504

(51) Int. Cl.
*H04N 5/225*  (2006.01)

(52) U.S. Cl.
CPC ......... *H04N 5/2252* (2013.01); *H04N 5/2253* (2013.01)

(58) Field of Classification Search
CPC .......................... H04N 5/2252; H04N 5/2253
See application file for complete search history.

(56) References Cited

U.S. PATENT DOCUMENTS

| 6,734,914 | B1* | 5/2004 | Nishimura | ........... H04N 13/239 |
| | | | | 348/375 |
| 2010/0073555 | A1* | 3/2010 | Li | ........................ H04N 5/2257 |
| | | | | 348/376 |
| 2016/0105598 | A1 | 4/2016 | Zeira et al. | |
| 2018/0335622 | A1* | 11/2018 | Trebouet | ................. B60R 11/04 |
| 2019/0072903 | A1* | 3/2019 | Park | ..................... H05K 5/061 |
| 2019/0171004 | A1* | 6/2019 | Bretagnol | ............ H04N 5/2252 |

FOREIGN PATENT DOCUMENTS

CN              108632523 A         10/2018

* cited by examiner

*Primary Examiner* — Padma Haliyur
(74) *Attorney, Agent, or Firm* — CKC & Partners Co., LLC

(57) ABSTRACT

An image capturing device includes an outer casing, an inner casing, a driving device and a camera module. The outer casing has an accommodation space and an opening communicating with each other. The inner casing is disposed inside the accommodation space and has a first side and a second side opposite to each other. The inner casing is configured to rotate relative to the outer casing, such that the first side is exposed from the opening or away from the opening. The driving device is at least partially disposed inside the inner casing and is connected with the outer casing. The driving device is configured to rotate the inner casing about an axis. The camera module is disposed on the first side and is configured to capture an image.

10 Claims, 4 Drawing Sheets

IMAGE CAPTURING DEVICE WITH A CLEAR STATUS OF OPERATION

RELATED APPLICATIONS

This application claims priority to Taiwanese Application Serial Number 109100504 filed Jan. 7, 2020, which is herein incorporated by reference.

BACKGROUND

Technical Field

The present disclosure relates to image capturing devices.

Description of Related Art

In the commercial society nowadays, since the competition becomes more intense, the interactions between companies are corresponding increased. In order to enhance the effect of interactions, the meetings to be held become inevitably more and more frequent.

During the progress of a meeting, the application of image capturing devices has become more popular, in order to improve the recording of information exchange between the participants. However, in order to avoid the leakage of confidential information, under the recording of the image capturing devices, the participants have to be particularly careful.

SUMMARY

A technical aspect of the present disclosure is to provide an image capturing device which can help to prevent any image of confidential information to be captured as record without the notice of the user in a simple and easy manner, such that the risk of leakage of confidential information is effectively decreased and the degree of privacy is increased.

According to an embodiment of the present disclosure, an image capturing device includes an outer casing, an inner casing, a driving device and a camera module. The outer casing has an accommodation space and an opening communicating with each other. The inner casing is disposed inside the accommodation space and has a first side and a second side opposite to each other. The inner casing is configured to rotate relative to the outer casing, such that the first side is exposed from the opening or away from the opening. The driving device is at least partially disposed inside the inner casing and is connected with the outer casing. The driving device is configured to rotate the inner casing about an axis. The camera module is disposed on the first side and is configured to capture an image.

In one or more embodiments of the present disclosure, the outer casing includes a base plate and a sidewall. The sidewall is disposed on the base plate and is surrounded to form a ring shape. An edge of the sidewall away from the base plate defines the opening. The sidewall and the base plate together define the accommodation space.

In one or more embodiments of the present disclosure, the outer casing further includes two first connecting portions. The first connecting portions are opposite to each other and are disposed on the sidewall. The inner casing at least partially locates between the first connecting portions. The inner casing has a second connecting portion. The second connecting portion is pivotally connected with one of the first connecting portions. The driving device connects with another one of the first connecting portions.

In one or more embodiments of the present disclosure, the driving device includes a static portion and a rotating portion. The static portion is disposed at the inner casing. The rotating portion is fixed to the corresponding first connecting portion and is configured to rotate relative to the static portion.

In one or more embodiments of the present disclosure, the first connecting portions, the second connecting portion and the static portion align along the axis.

In one or more embodiments of the present disclosure, the inner casing is at least partially of a spherical shape. The axis penetrates through a center of the spherical shape.

In one or more embodiments of the present disclosure, the first connecting portions restrict a degree of freedom of the inner casing along an alignment direction of the first connecting portions.

In one or more embodiments of the present disclosure, a profile of an outer edge of the first side matches with a profile of an inner edge of the opening.

In one or more embodiments of the present disclosure, a profile of an outer edge of the second side is the same as the profile of the outer edge of the first side.

In one or more embodiments of the present disclosure, the opening is of a circular shape.

In one or more embodiments of the present disclosure, the driving device is a stepping motor.

In one or more embodiments of the present disclosure, the image capturing device further includes a processor and a wireless signal transceiver. The processor is disposed inside the inner casing and is electrically connected with the driving device. The wireless signal transceiver is disposed inside the inner casing and is electrically connected with the processor.

The above-mentioned embodiments of the present disclosure have at least the following advantages:

(1) During the operation of the image capturing device, when the user intends to capture a video image or a photo image by the camera module, the user can switch on the driving device to rotate the inner casing relative to the outer casing, such that the camera module is exposed from the opening of the outer casing to carry out image-capturing. When the user intends not to capture a video image or a photo image by the camera module, the user can switch on the driving device to rotate the inner casing relative to the outer casing, such that the camera module is hidden inside the outer casing to stop image-capturing. Since the user can judge whether the camera module is in the status of image-capturing from merely the appearance of the image capturing device in a simple and easy manner, the user is uneasy to judge by mistake that the camera module has stopped image-capturing when the camera module is still carrying out image-capturing. In this way, the image capturing device can help to prevent any image of confidential information to be captured as record without the notice of the user in a simple and easy manner, such that the risk of leakage of confidential information is effectively decreased and the degree of privacy is increased.

(2) Since the profile of the outer edge of the first side of the inner casing matches with the profile of the inner edge of the opening of the outer casing, when the first side of the inner casing is exposed from the opening of the outer casing, a gap between the inner casing and the inner edge of the outer casing defining the opening can be effectively reduced. In this way, the outlook appearance of the image capturing device can be effectively enhanced, and the chance of foreign objects (such as dust) getting into the accommodation space is also effectively reduced.

(3) Since the inner casing is at least partially of a spherical shape, when the inner casing is rotated about the axis, a gap between the spherical outer surface of the inner casing and the inner edge of the outer casing defining the opening can be effectively reduced. In this way, the chance of foreign objects getting into the outer casing during the rotation of the inner casing about the axis is also effectively reduced.

(4) Since the image capturing device can be operated through wireless signals, the image capturing device can be installed at locations uneasy to be touched by people, facilitating a better convenience and practicality for the user.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
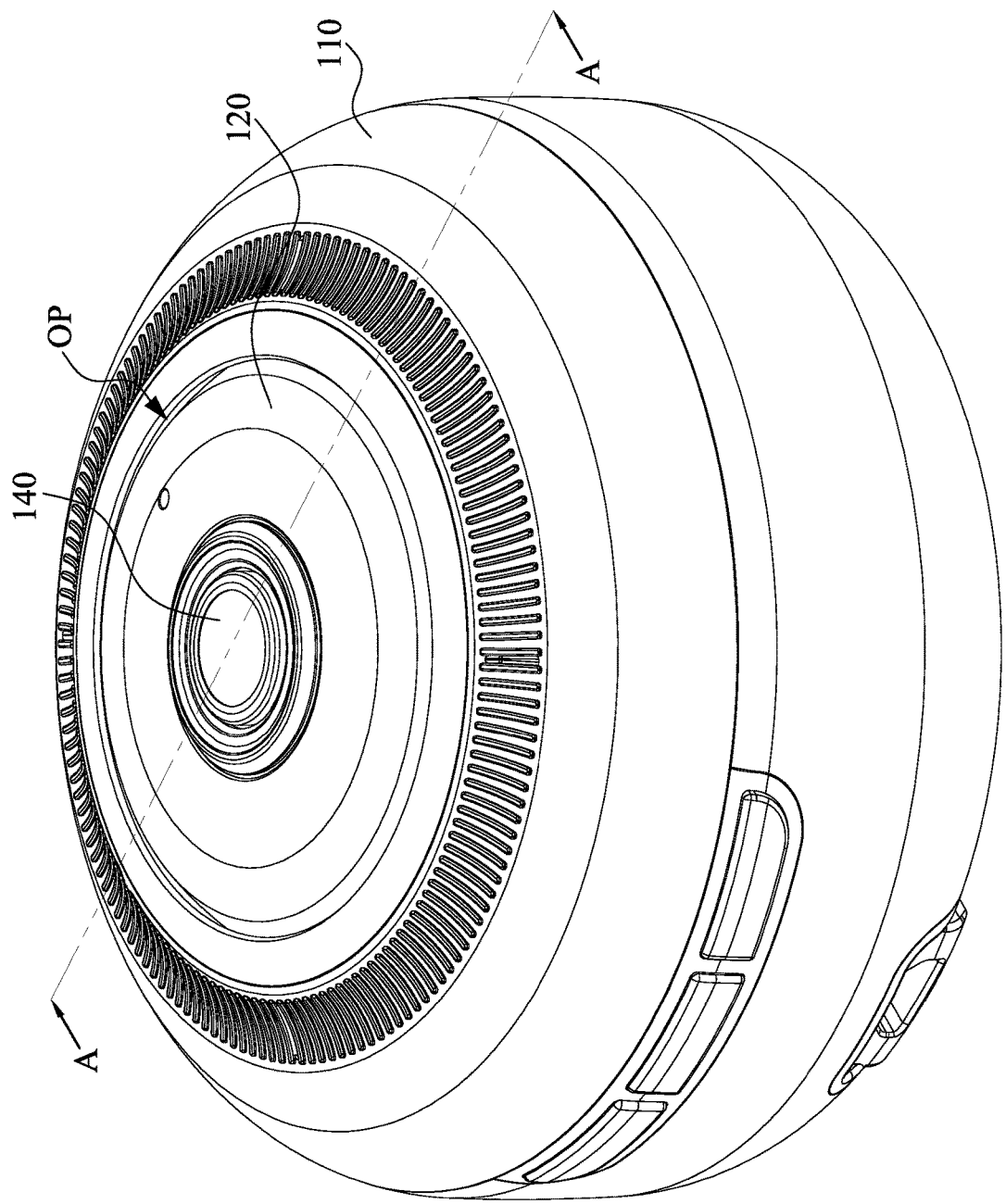
FIG. 1 is a schematic view of an image capturing device according to an embodiment of the present disclosure, in which a camera module is exposed outside an outer casing.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
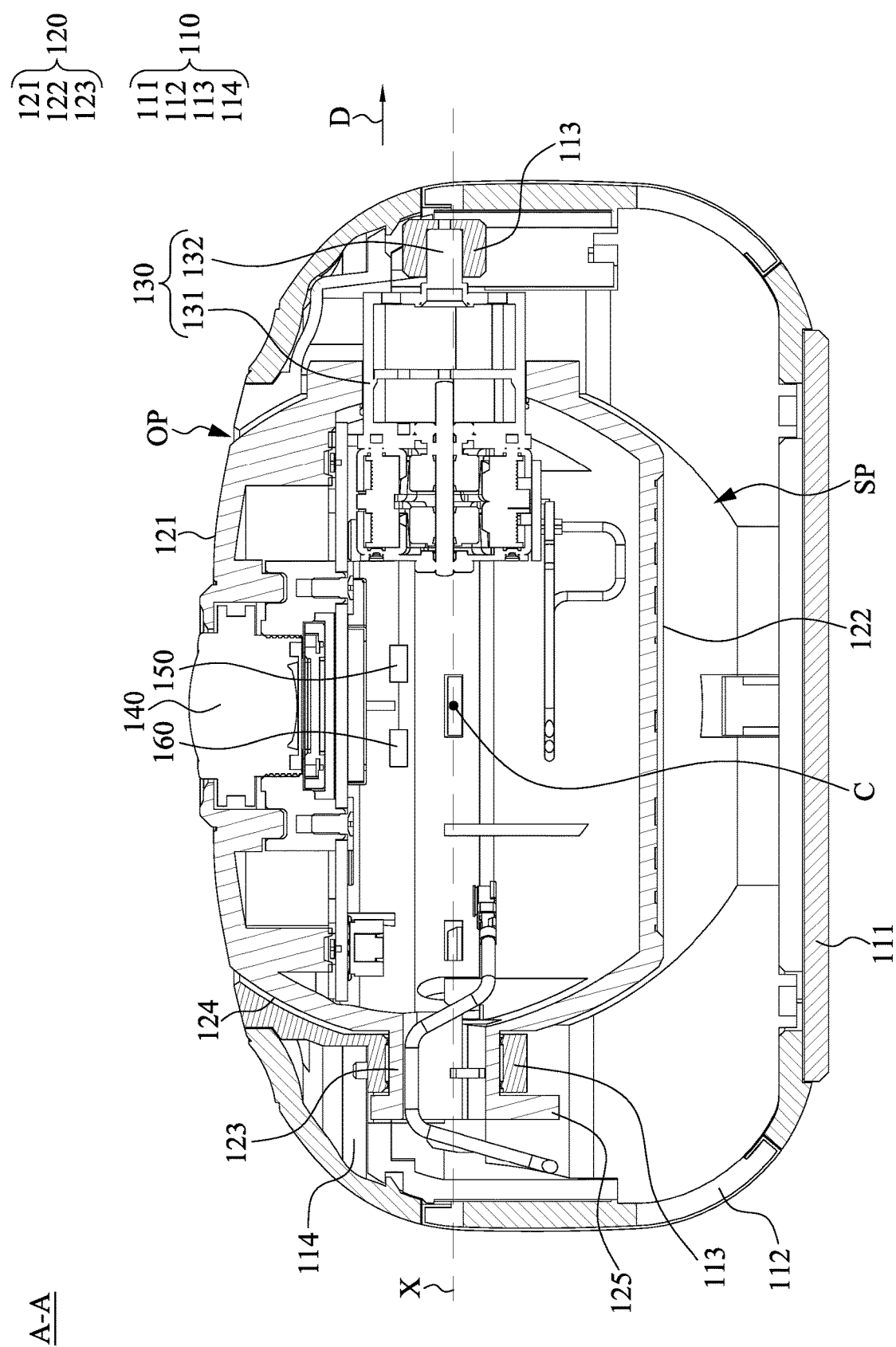
FIG. 2 is a cross-sectional view along the section line A-A of FIG. 1.

Reference is made to FIGS. 1-2. FIG. 1 is a schematic view of an image capturing device 100 according to an embodiment of the present disclosure, in which a camera module 140 is exposed outside an outer casing 110. FIG. 2 is a cross-sectional view along the section line A-A of FIG. 1. In this embodiment, as shown in FIGS. 1-2, an image capturing device 100 includes an outer casing 110, an inner casing 120, a driving device 130 and a camera module 140. The outer casing 110 has an accommodation space SP and an opening OP communicating with each other. The inner casing 120 is disposed inside the accommodation space SP. The inner casing 120 has a first side 121 and a second side 122 opposite to each other. The inner casing 120 is configured to rotate relative to the outer casing 110, such that the first side 121 of the inner casing 120 is exposed from the opening OP or away from the opening OP of the outer casing 110. The driving device 130 is at least partially disposed inside the inner casing 120 and is connected with the outer casing 110. The driving device 130 is configured to rotate the inner casing 120 about an axis X. The camera module 140 is disposed on the first side 121 of the inner casing 120 and is configured to capture an image. The camera module 140 can, for example, adopt a charge coupled device (CCD), a complementary metal-oxide semiconductor (CMOS) or other similar image capturing elements. To be specific, the image captured by the camera module 140 can be a video image or a photo image. However, this does not intend to limit the present disclosure.

Figure 3:
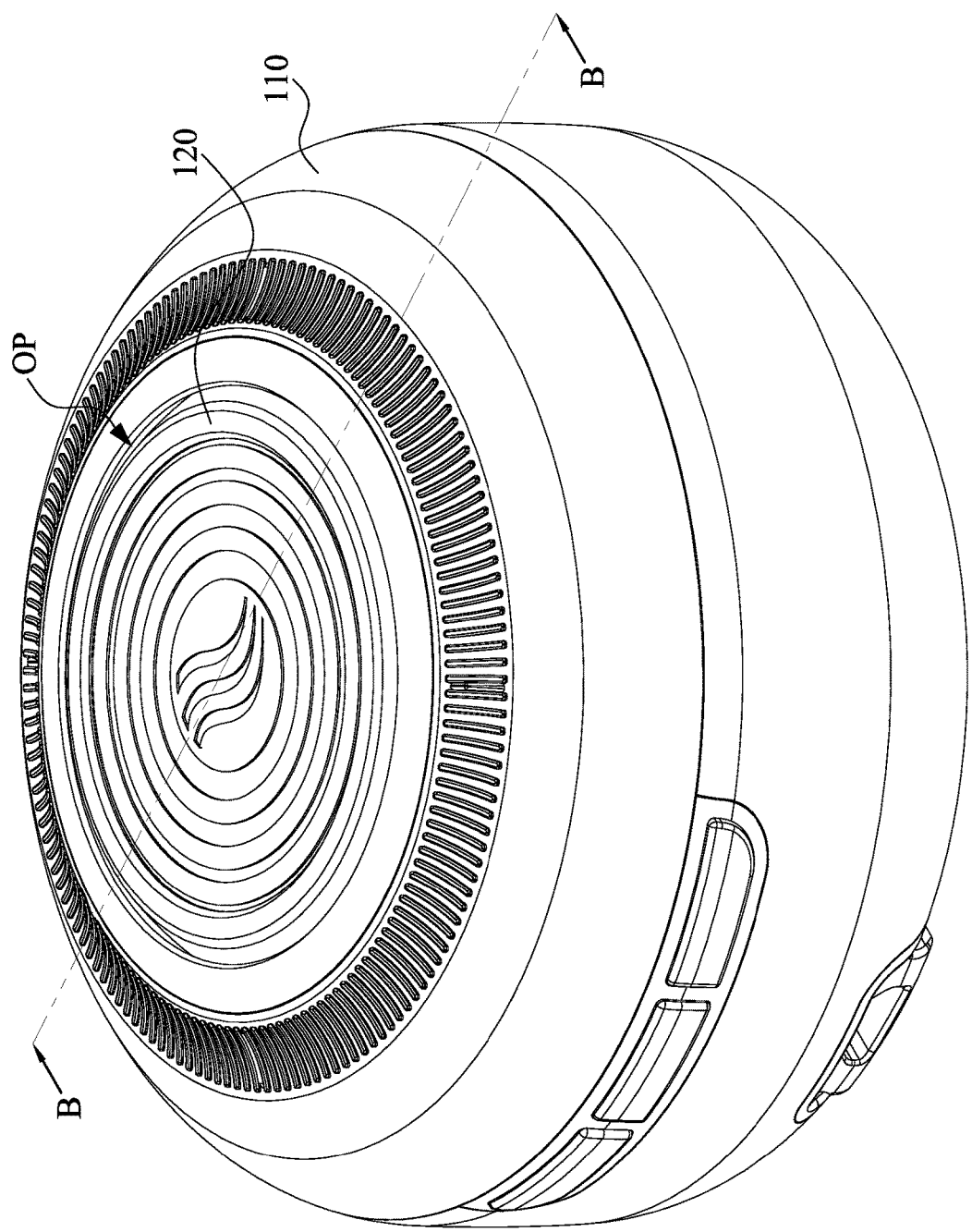
FIG. 3 is a schematic view of the image capturing device of FIG. 1, in which the camera module is hidden inside the outer casing.
Figure 4:
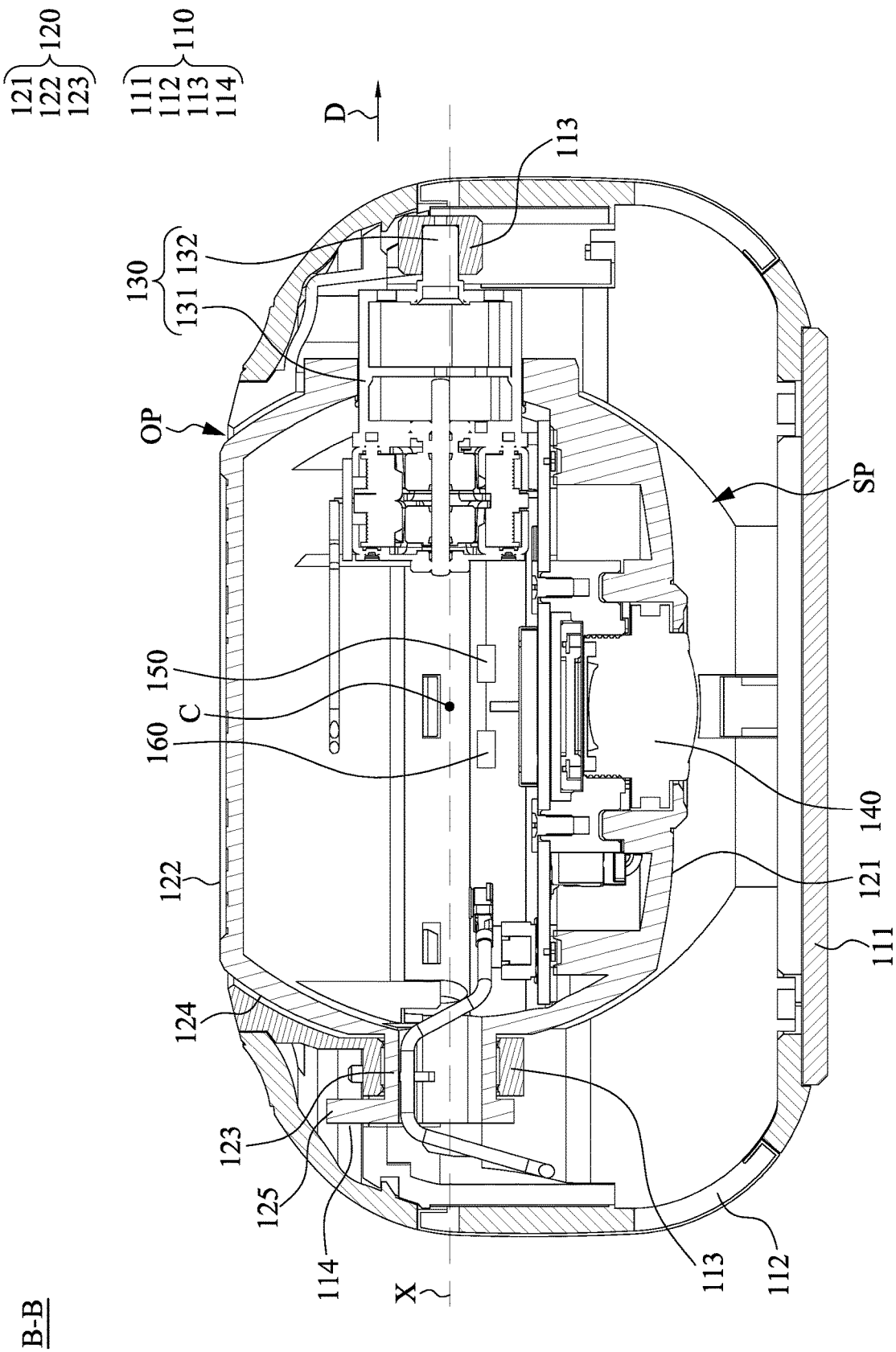
FIG. 4 is a cross-sectional view along the section line B-B of FIG. 3.

Please refer to FIGS. 3-4. FIG. 3 is a schematic view of the image capturing device 100 of FIG. 1, in which the camera module 140 is hidden inside the outer casing 110. FIG. 4 is a cross-sectional view along the section line B-B of FIG. 3. In this embodiment, as shown in FIGS. 1-4, by the rotation of the inner casing 120 relative to the outer casing 110, a user can expose the camera module 140 from the opening OP of the outer casing 110, or move the camera module 140 away from the opening OP of the outer casing 110, so as to hide the camera module 140 inside the outer casing 110.

During the operation of the image capturing device 100, when the user intends to capture an image by the camera module 140, the user can switch on the driving device 130 to rotate the inner casing 120 relative to the outer casing 110, such that the camera module 140 is exposed from the opening OP of the outer casing 110 to carry out image-capturing. When the user intends not to capture an image by the camera module 140, the user can switch on the driving device 130 to rotate the inner casing 120 relative to the outer casing 110, such that the camera module 140 is hidden inside the outer casing 110 to stop image-capturing. Since the user can judge whether the camera module 140 is in the status of image-capturing from merely the appearance of the image capturing device 100 in a simple and easy manner, the user is uneasy to judge by mistake that the camera module 140 has stopped image-capturing when the camera module 140 is still carrying out image-capturing. In this way, the image capturing device 100 can help to prevent any image of confidential information to be captured as record without the notice of the user in a simple and easy manner, such that the risk of leakage of confidential information is effectively decreased and the degree of privacy is increased.

Structurally speaking, as shown in FIGS. 2 and 4, the outer casing 110 includes a base plate 111 and a sidewall 112. The sidewall 112 is disposed on the base plate 111. Moreover, the sidewall 112 surrounds the base plate 111 to form a ring shape. An edge of the sidewall 112 away from the base plate 111 defines the opening OP. The sidewall 112 of the ring shape and the base plate 111 together define the accommodation space SP. As mentioned above, the opening OP and the accommodation space SP are communicated with each other.

In addition, in this embodiment, the outer casing 110 further includes two first connecting portions 113. As shown in FIGS. 2 and 4, the first connecting portions 113 are opposite to each other and are disposed on the sidewall 112 of the outer casing 110 along an alignment direction D. The inner casing 120 is at least partially located between the two first connecting portions 113 of the outer casing 110 which are disposed oppositely. It is worth to note that, since the inner casing 120 is blocked by the first connecting portions 113, the first connecting portions 113 can restrict a degree of freedom of the inner casing 120 along the alignment direction D of the first connecting portions 113. Relatively, the inner casing 120 has a second connecting portion 123. The second connecting portion 123 of the inner casing 120 is pivotally connected with one of the first connecting portions 113, and the driving device 130 is connected with another one of the first connecting portions 113 and the inner casing 120. In this way, the relative position of the inner casing 120 and the outer casing 110 can be secured.

Furthermore, as shown in FIGS. 2 and 4, the driving device 130 includes a static portion 131 and a rotating portion 132. The static portion 131 of the driving device 130 is disposed at the inner casing 120. The rotating portion 132 of the driving device 130 is connected and fixed to the corresponding first connecting portion 113, and the rotating portion 132 of the driving device 130 is configured to rotate relative to the static portion 131. To be more specific, the first connecting portions 113 of the outer casing 110, the second connecting portion 123 of the inner casing 120, and the static portion 131 and the rotating portion 132 of the driving device 130 align along the axis X. In this way, when the user switches on the driving device 130, the rotating portion 132 of the driving device 130 rotates about the axis X relative to the static portion 131. However, as mentioned above, since the static portion 131 of the driving device 130 is disposed at the inner casing 120, and the rotating portion 132 of the driving device 130 is connected and fixed to the corresponding first connecting portion 113, when the rotating portion 132 rotates about the axis X relative to the static portion 131, the static portion 131 of the driving device 130 is practically driven to rotate with the inner casing 120 about the axis X relative to the outer casing 110.

In practical applications, the driving device 130 is a stepping motor. The stepping motor can allow the rotating portion 132 to rotate relative to the static portion 131 about the axis X by a specific angle, for example +/−180 degrees, according to the requirement. To be specific, when the camera module 140 is exposed from the opening OP of the outer casing 110, the user can rotate the inner casing 120 together with the camera module 140 about the axis X by 180 degrees, such that the camera module 140 is moved away from the opening OP of the outer casing 110 and the camera module 140 is hidden inside the outer casing 110. On the other hand, when the camera module 140 is hidden inside the outer casing 110, the user can also rotate the inner casing 120 together with the camera module 140 about the axis X by 180 degrees, such that the camera module 140 is exposed from the opening OP of the outer casing 110. Moreover, according to the rotation of the stepping motor based on signal impulses and the characteristic of positioning and speed controlling, the user can control and restrict the rotating angle of the inner casing 120 relative to the outer casing 110 about the axis X, such as the angle of +/−180 degrees as mentioned above, and thus the inner casing 120 can be rotated to a precise position relative to the outer casing 110. Moreover, the angle of the inner casing 120 relative to the outer casing 110 after rotation can be secured. In other embodiments, according to the actual situation, the driving device 130 can be a direct current motor. However, this does not intend to limit the present disclosure.

In addition, in this embodiment, the inner casing 120 further includes a stopping structure 125. As shown in FIGS. 2 and 4, the stopping structure 125 is protruded from the second connecting portion 123. When the second connecting portion 123 rotates about the axis X, the stopping structure 125 rotates with the second connecting portion 123. For example, when the inner casing 120 is rotated until the camera module 140 is away from the opening OP of the outer casing 110, i.e., after the inner casing 120 is rotated by 180 degrees when the camera module 140 is exposed from the opening OP of the outer casing 110, then the stopping structure 125 abuts against the stopping portion 114 of the outer casing 110, as shown in FIG. 4, in order to prevent the second connecting portion 123 and the inner casing 120 from rotating more than 180 degrees relative to the outer casing 110. Thus, the effect of position restriction can be achieved.

It is worth to note that, in this embodiment, as shown in FIG. 1, a profile of an outer edge of the first side 121 of the inner casing 120 matches with a profile of an inner edge of the opening OP of the outer casing 110. Therefore, when the first side 121 of the inner casing 120 is exposed from the opening OP of the outer casing 110, a gap between the inner casing 120 and the inner edge of the outer casing 110 defining the opening OP can be effectively reduced. In this way, the outlook appearance of the image capturing device 100 can be effectively enhanced, and the chance of foreign objects (such as dust) getting into the accommodation space SP is also effectively reduced. In this embodiment, the opening OP of the outer casing 110 is of a circular shape. However, this does not intend to limit the present disclosure.

Moreover, as shown in FIGS. 2 and 4, the inner casing 120 is at least partially of a spherical shape. To be specific, the inner casing 120 can be formed from two hemispheres, and the first side 121 and the second side 121 of the inner casing 120 are located on different hemispheres. To be exact, an outer surface 124 located between the first side 121 and the second side 122 of the inner casing 120 is of a spherical shape, and the axis X penetrates through a center C of the spherical inner casing 120. Thus, when the inner casing 120 is rotated about the axis X, a gap between the spherical outer surface 124 of the inner casing 120 and the inner edge of the outer casing 110 defining the opening OP can be effectively reduced. In this way, the chance of foreign objects getting into the outer casing 110 during the rotation of the inner casing 120 about the axis X is also effectively reduced. However, in other embodiments, according to the actual situation, the outer surface 124 can be designed as non-spherical. However, this does not intend to limit the present disclosure.

On the other hand, as shown in FIG. 3, a profile of an outer edge of the second side 122 of the inner casing 120 is substantially the same as the profile of the outer edge of the first side 121, which means the profile of the outer edge of the second side 122 of the inner casing 120 also matches with the profile of the inner edge of the opening OP of the outer casing 110. Therefore, when the second side 122 of the inner casing 120 is exposed from the opening OP of the outer casing 110 and the first side 121 is hidden inside the outer casing 110, a gap between the inner casing 120 and the inner edge of the outer casing 110 defining the opening OP can be effectively reduced. In this way, the outlook appearance of the image capturing device 100 can be effectively enhanced, and the chance of foreign objects (such as dust) getting into the accommodation space SP is also effectively reduced.

In this embodiment, the image capturing device 100 further includes a processor 150 and a wireless signal transceiver 160. As shown in FIGS. 2 and 4, the processor 150 is disposed inside the inner casing 120, and the processor 150 is electrically connected with the driving device 130. The wireless signal transceiver 160 is also disposed inside the inner casing 120, and the wireless signal transceiver 160 is electrically connected with the processor 150. In practical applications, the user can transmit a wireless signal to the wireless signal transceiver 160. The wireless signal can include control instructions to switch on the driving device 130. After the wireless signal transceiver 160 receives the wireless signal, the wireless signal transceiver 160 then transmits a signal to the processor 150 and makes the processor 150 to switch on the driving device 130, such that the inner casing 120 is rotated relative to the outer casing 110, and the camera module 140 is hidden inside the outer casing 110 or exposed from the opening OP of the outer casing 110. In this way, since the image capturing device 100 can be operated through wireless signals, the image capturing device 100 can be installed at locations uneasy to be touched by people, facilitating a better convenience and practicality for the user. For example, the wireless signals can be transmitted through ways such as Wi-Fi or Bluetooth. Thus, the user can use remote electronic devices (such as smartphones or notebook computers) to connect and match with the image capturing device 100 and then transmit wireless signals to operate the image capturing device 100. However, this does not intend to limit the present disclosure. The processor 150 as mentioned above can be a central processing unit (CPU), a system on chip (SoC), an application processor, a digital signal processor, or a processing chip/controller with specific functions. The wireless signal transceiver 160 as mentioned above can be a Wi-Fi signal transceiver, a Bluetooth signal transceiver or a communication chip supporting wireless network.

In conclusion, the aforementioned embodiments of the present disclosure have at least the following advantages:

(1) During the operation of the image capturing device, when the user intends to capture a video image or a photo image by the camera module, the user can switch on the driving device to rotate the inner casing relative to the outer casing, such that the camera module is exposed from the opening of the outer casing to carry out image-capturing. When the user intends not to capture a video image or a photo image by the camera module, the user can switch on the driving device to rotate the inner casing relative to the outer casing, such that the camera module is hidden inside the outer casing to stop image-capturing. Since the user can judge whether the camera module is in the status of image-capturing from merely the appearance of the image capturing device in a simple and easy manner, the user is uneasy to judge by mistake that the camera module has stopped image-capturing when the camera module is still carrying out image-capturing. In this way, the image capturing device can help to prevent any image of confidential information to be captured as record without the notice of the user in a simple and easy manner, such that the risk of leakage of confidential information is effectively decreased and the degree of privacy is increased.

(2) Since the profile of the outer edge of the first side of the inner casing matches with the profile of the inner edge of the opening of the outer casing, when the first side of the inner casing is exposed from the opening of the outer casing, a gap between the inner casing and the inner edge of the outer casing defining the opening can be effectively reduced. In this way, the outlook appearance of the image capturing device can be effectively enhanced, and the chance of foreign objects (such as dust) getting into the accommodation space is also effectively reduced.

(3) Since the inner casing is at least partially of a spherical shape, when the inner casing is rotated about the axis, a gap between the spherical outer surface of the inner casing and the inner edge of the outer casing defining the opening can be effectively reduced. In this way, the chance of foreign objects getting into the outer casing during the rotation of the inner casing about the axis is also effectively reduced.

(4) Since the image capturing device can be operated through wireless signals, the image capturing device can be installed at locations uneasy to be touched by people, facilitating a better convenience and practicality for the user.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An image capturing device, comprising:
   an outer casing, comprising:
      a base plate;
      a sidewall disposed on the base plate and surrounded to form a ring shape, an edge of the sidewall away from the base plate defining an opening, the sidewall and the base plate together defining an accommodation space communicated with the opening; and
      two first connecting portions opposite to each other and disposed on the sidewall;
   an inner casing disposed inside the accommodation space and at least partially locating between the first connecting portions, the inner casing having a first side and a second side opposite to each other and having a second connecting portion pivotally connected with one of the first connecting portions, the inner casing being configured to rotate relative to the outer casing, such that the first side is exposed from the opening or away from the opening;
   a driving device at least partially disposed inside the inner casing and connected with another one of the first connecting portions, the driving device being configured to rotate the inner casing about an axis; and
   a camera module disposed on the first side and configured to capture an image.

2. The image capturing device of claim 1, wherein the driving device comprises a static portion and a rotating portion, the static portion is disposed at the inner casing, the rotating portion is fixed to the corresponding first connecting portion and configured to rotate relative to the static portion.

3. The image capturing device of claim 2, wherein the first connecting portions, the second connecting portion and the static portion align along the axis.

4. The image capturing device of claim 3, wherein the inner casing is at least partially of a spherical shape, the axis penetrates through a center of the spherical shape.

5. The image capturing device of claim 1, wherein the first connecting portions restrict a degree of freedom of the inner casing along an alignment direction of the first connecting portions.

6. The image capturing device of claim 1, wherein a profile of an outer edge of the first side matches with a profile of an inner edge of the opening.

7. The image capturing device of claim 6, wherein a profile of an outer edge of the second side is the same as the profile of the outer edge of the first side.

8. The image capturing device of claim 1, wherein the opening is of a circular shape.

9. The image capturing device of claim 1, wherein the driving device is a stepping motor.

10. The image capturing device of claim 1, further comprising:
- a processor disposed inside the inner casing and electrically connected with the driving device; and
- a wireless signal transceiver disposed inside the inner casing and electrically connected with the processor.

* * * * *